3,413,286
[17α,16α-d]OXAZOLINE PREGNANES AND
PROCESS THEREFOR
Giangiacomo Nathansohn and Giorgio Winters, Milan,
Italy, assignors to Lepetit S.p.A. Milan, Italy
No Drawing. Filed Mar. 30, 1966, Ser. No. 538,555
Claims priority, application Great Britain, Apr. 22, 1965,
17,027/65; Aug. 20, 1965, 35,865/65
3 Claims. (Cl. 260—239.55)

This invention is concerned with new steroids. More particularly, the compounds with which this invention is concerned are steroid -[17α,16α-d] oxazolines of the formula

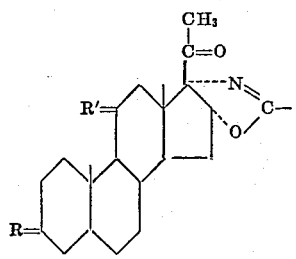

wherein R is a member of the class consisting of H(β-OH), H(β-OAcyl) O; R' is a member of the class consisting of $H_2$ and O; R" is a member of the class consisting of H, alkyl, aralkyl and aryl group. A double bond may be present at position 4 or 5 (6). When no double bond is present, the class of steroids herein claimed belongs to the 5α-series.

The process for the preparation of the novel compounds starts from a 16β,17β-epoxide and runs through the following steps:

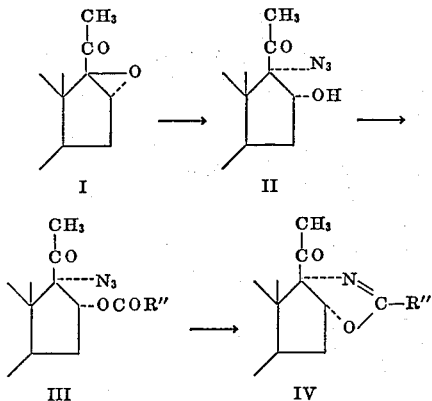

The process consists of refluxing one part by weight of the 16β,17β-epoxide with 2–4 parts by weight of sodium azide in a water miscible organic solvent in the presence of an amount of any acid capable to set free hydrazoic acid from its salts, said acid being added in a ratio of one to at least three equivalents to one mole of the epoxide.

The obtained 16α-hydroxy-17α-azidosteroid is then acylated by usual procedures, as for instance by treatment with a carboxylic acid anhydride in the presence of pyridine, and the 16α-acyloxy-17α-azidosteroid is converted into the 2'-substituted-[17α,16α-d]-oxazoline by catalytic hydrogenation in the presence of a Pt, Pd or Ni catalyst. When a 3β-OH group is present, it can optionally be oxidized to 3-keto group to give the compounds of the generic formula in which R is oxygen.

In the first step of the process hereinbefore described it has been found that by carrying out the epoxide ring cleavage, i.e. the step from I to II above, in particular solvents, such as f.i. dimethylformamide or anhydrous dimethyl-sulfoxide, it is possible to control the reaction in order to isolate some stereoisomers of the 16α-hydroxy-17α-azidosteroid which form as intermediates. Thus, the formation of 16β-hydroxy-17α-azidosteroids and/or 16β-hydroxy-17β-azidosteroids has been observed along with the desired 16α-hydroxy-17α-azidosteroids. Both these stereoisomers through a retroaldol rearrangement are easily converted into compound II by processes which are described in detail in the appended examples and which consist in contacting a solution of the undesired stereoisomer with an alkaline agent such as alkali metal hydroxides, alkaline earth hydroxides, ammonia, sodium azide and so on. Occasionally, also anhydrous acidic agents may promote the rearrangement, though in a longer time.

A further side product is occasionally observed when product III above, i.e. the 16α-acyloxy-17α-azidosteroid, is converted into the oxazoline IV. The side product is the 16α-hydroxy-17α-acylmido derivative.

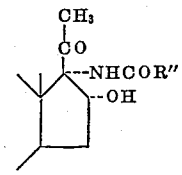

which, when present, is readily converted into the oxazoline, for instance by treating it in benzene in the presence of traces of an acidic catalyst such as p-toluenesulfonic acid, sulfuric acid, hydrochloric acid etc.

The steroidal oxazolines as well as most of the intermediates and the other stearoidal substances herein described, show interesting pharmacological activities as progestinics and antiinflammatory agents. Moreover, the end oxazolines are useful intermediate compounds for the preparation of the steroids claimed in our copending application.

The process hereinbefore described gives rise to a number of steroidal structures which all show a considerable degree of pharmacological interest. Besides the oxazolines, represented in the generic formula above, which are the end products of the main process of our invention, other generic formulae of novel compounds deriving from the process include the following

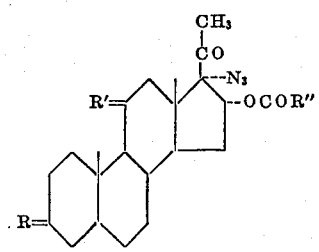

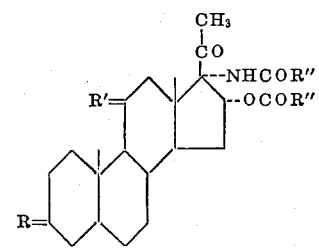

wherein R, R' and R" have the same significances which have been given above for the interpretation of the generic formula of the steroidal oxazolines, and wherein a double bond may be present in positions 4 or 5 (6).

The several substituents which are present in those parts of the steroidal molecule not being affected by the processes herein described, and represented as symbols R and R' in the generic formula, may be present in the starting compounds or may be subsequently introduced or transformed according to well known procedures.

For the purpose of illustration only, the following examples are given, which, however, do not intend to establish the limits of our invention. These limits are given only by the generic formulas above and by the several processes described throughout the specification.

EXAMPLE 1

Preparation of 5α-pregnane-3β-ol-11,20-dione 17α,16α-d-2′-methyloxazoline (a) 17α-bromo-5α-pregnane-3β,16β-diol-11,20-dione 3 acetate. To a solution of 175 g. of 5α-pregn-16-en-3β-ol-11,20-dione 3-acetate in 2300 ml. of tetrahydrofuran, 1340 ml. of $HClO_4$ 0.46 N are added stirring and in the darkness, followed by 115.3 g. of N-bromoacetamide. After 4 hours the excess N-bromo-acetamide is destroyed by the addition of sodium bisulfite, the solvent is distilled off and the residue is diluted with water. Yield 230 g.; M.P. 169–172° C.; from benzene, M.P. 195–198° C.; $[\alpha]_D+19.9°$ (c. 0.5, $CHCl_3$). The corresponding 3-propionate can be prepared in the same way and has M.P. 173–175° C.

(b) 16β,17β - epoxy - 5α,17α - pregnane-3β-ol-11,20-dione. To a boiling solution of 222 g. of the above derivative in 2000 ml. of methanol a solution of 73 g. of KOH in 111 ml. of water and 435 ml. of methanol is added. After refluxing for 1 hour the mixture is concentrated to about ⅕ of its volume and diluted with water. The precipitate is collected and dried. Yield 140 g.; M.P. 175–178° C.; $[\alpha]_D-11.3°$ (c. 0.5, $CHCl_3$) (after crystallization from benzene). The acetate has M.P. 205–207° C.

(c) 17α - azido - 5α - pregnane - 3β,16α-diol-11,20-dione. A mixture of 20 g. of the above epoxide, 60 g. of $NaN_3$, 4.2 ml. of $H_2SO_4$, 150 ml. of water and 300 ml. of ethanol is refluxed for 6 hours. After concentration to about one third of the volume the mass is diluted with water and extracted with ethyl acetate. After evaporation of the organic solvent the residue (19.7 g.) is recrystallized from methyl acetate, M.P. 233–234° C. $[\alpha]_D-48.3°$ (c. 0.5, $CH_3OH$). The 3β,16α-diacetate (prepared from acetic anhydride-pyridine) has M.P. 167–169° C. $[\alpha]_D-82.4°$ (c. 0.5, $CHCl_3$).

(d) A solution of 38 g. of 17α-azido - 5α - pregnane-3β,16α-diol-11,20-dione-3,16-diacetate in 2300 ml. of methanol is hydrogenated at ordinary pressure in the presence of 11 g. of $PtO_2$. The mixture is filtered, the solvent is distilled off from the filtrate and the residue is boiled 1 hour in benzene with traces of p-toluensulfonic acid, quantitatively giving the desired 5α-pregnane-3β-ol-11,20 - dione - [17α,16α-d]-2′-methyl-oxazoline 3-acetate, M.P. 243–248° C., $[\alpha]_D+78.5°$ (c. 0.5, $CHCl_3$).

The oxazoline 3-acetate obtained as above is easily converted into the corresponding 3-OH compound by short refluxing with a water-methanol solution of KOH or dilute hydrochloric acid. The oxazoline has M.P. 210–212° C., $[\alpha]_D+103.5°$ (c. 0.5, $CHCl_3$).

EXAMPLE 2

Preparation of 4-pregnene-3,20-dione-[17α,16α-d]-2′-methyloxazoline (a) To a solution of 40 g. of 16β,17β-epoxy-17α-pregn-5-ene-3β-ol-20-one in 400 ml. of dimethylformamide 6.8 g. of 98% $H_2SO_4$ in 8 ml. of water are added followed by 80 g. of sodium azide. After 2 hours at 120–125° C. the mixture still hot is diluted with 300 ml. of a 3% solution of sodium bicarbonate in water, followed by 700 ml. of warm water added slowly. After spontaneous cooling the precipitate is collected and dried. Crude yield 40.2 g. of a product which is used as such for the subsequent acetylation step. A sample recrystallized from methanol shows M.P. 216–217° C., $[\alpha]_D-127.5°$ (c. 1, $CHCl_3$).

(b) The above 17α - azido - pregn - 5 - ene - 3β,16α-diol-20-one dissolved in 80 ml. of pyridine, is reacted at room temperature with 46.5 ml. of acetic anhydride. After 16 hours the mixture is poured into dilute hydrochloric acid (2%) and the precipitate is collected. After recrystallization from methanol the compound has M.P. 186–188° C., $[\alpha]_D-159°$ (c. 1, $CHCl_3$). Yield 26 g. (53%) of 17α - azido - pregn - 5 - ene - 3β,16α-diol-20-dione-3, 16-diacetate.

(c) Ten grams of the above product dissolved in 3000 ml. of methanol are hydrogenated with 30 g. of Raney-Ni; after 1 hour the catalyst is removed by filtration and the solvent is distilled off; 9.3 g. of 17α-acetamido-pregn-5-ene-3β,16α - diol - 20 - one 3-acetate are obtained. This compound is cyclized to oxazoline by boiling with 100 mg. of p-toluenesulfonic acid in benzene for 1 hour. The solution is washed with dilute $NaHCO_3$, and subsequently evaporated to dryness; 8.8 g. of crude oxazoline are obtained with M.P. 164–168° C. A crystallization from methanol yields 7 g. (77%) of the compound with M.P. 174–176°; a further crystallization from methanol carried out on a very small amount of the substance gave a product with M.P. 177° C. This substance is 5-pregnene-3β-ol-20-one - 17α,16α-d - 2′-methyloxazoline-3-acetate.

(d) Twenty-two ml. of aqueous 1% KOH are added to a solution of 5 g. of 5-pregnene-3β-ol-20-one-[17α,16α-d]-2′-methyloxazoline 3-acetate in 80 ml. of methanol, and the mixture is refluxed for 15 minutes under nitrogen. The mixture is adjusted to neutral pH with acetic acid, then concentrated to one half of its volume and diluted with warm water. After cooling 3.5 g. of product are obtained (77%), M.P. 200–205° C. This product is 5-pregnene - 3β - ol - 20 - one - [17α,16α-d]-2′-methyloxazoline. $[\beta]_D+5.5°$ (c. 0.5, $CHCl_3$).

(e) An amount of 6.6 g. of the above product is dissolved in 300 ml. of toluene and 60 ml. of cyclohexanone and to the solution 3 g. of Al isopropoxide dissolved in 40 ml. of toluene are added. After 1 hour of refluxing 2.2 ml. of acetic acid are added and a steam distillation is carried out for 4 hours. The solid residue is collected and dissolved in hot methanol; after filtration the solution is concentrated to dryness, and the obtained crude material is crystallized from ethyl acetate. The M.P. is 196–198° C., yield 5 g. (75%) of 4-pregnene-3,20-dione-[17α,16α - d] - 2′ - methyloxazoline, $[\alpha]_D+130.5°$ (c. 0.5, $CHCl_3$).

EXAMPLE 3

Preparation of 4-pregnene-3,20-dione-[17α,16α-d]-2′-methyloxazoline

Starting from 17α - pregn-4-ene-3,20-dione - 16β,17β-epoxide and operating as described in Example 2, 17α-azido - 4 - pregnen-16α-ol-3,20-dione is prepared, M.P. 225–227° C., $[\alpha]_D+1°$ (c. 0.5, $CHCl_3$); the acetate melts at 124–125° C., $[\alpha]_D-68.4°$ (c. 0.5, $CHCl_3$). From the 16α-hydroxy - 17α - azido compound, 4-pregnene-3,20-dione-[17α,16α - d] - 2′ - methyloxazoline is prepared operating as described in Example 2; this product is obtained in yield of 77%, M.P. 196–198° C., $[\alpha]_D+130.5°$ (c. 0.5, $CHCl_3$).

EXAMPLE 4

Preparation of 5α-pregnane-3,11,20-trione-[17α,16α-d]-2′-phenyl-oxazoline (a) An amount of 38 g. of 16β,17β-epoxy-5α-pregnane-3β-ol-11,20-dione dissolved in acetone is oxidized at room temperature with an 8 N solution of $H_2CrO_4$ in $H_2SO_4$. Water is added and the solvent is evaporated thus obtaining 37 g. (97%) of 16β,17β-epoxy-5α-pregnane-3,11, 20-trione, M.P. 205–208° C., $[\alpha]_D+9.4°$ (c. 0.70, $CHCl_3$).

(b) Twenty grams of said compound are added to 60 g. of sodium azide suspended in dimethylsulfoxide and $H_2SO_4$ (100:1). The mixture is heated to 90° C. for 1 hour, then it is poured into aqueous 0.5% hydrochloric acid. Water is added and the organic solvents are removed obtained solution is made neutral with $NaHCO_3$ and concentrated in vacuo. The obtained oil is taken up with methanol-tetrahydrofuran (6:4.8). Aqueous 10% K₂CO₃ is added (95 ml.) under N₂ stream and with stirring; the temperature is kept under 20° C. Stirring is continued for 30 minutes, then the solution is made neutral with acetic acid. Water is added and the organic solvents are removed in vacuo, then the aqueous solution is extracted with chloroform; the product is then purified by column percolation through silicagel. The resulting product after crystallization from ethanol melts at 225–228° C. Yield 18 g. (80%) of 17α - azido-5α-pregnane-16α-ol-3,11,20-trione.

(c) This compound (10 g.) dissolved in 70 ml. of anhydrous pyridine is reacted at 0° C. with 6.5 ml. of benzoyl chloride. After 7 hours at room temperature the mixture is poured into one half liter aqueous 5% hydrochloric acid. An extraction is made with methylene chloride, the extract is made neutral and evaporated to dryness, thus obtaining 17α - azido - 5α - pregnane-16α-ol-3,11,20-trione-16-benzoate. The product is recrystallized from ethyl ether giving a yield of 10 g. (78%), M.P. 220–222° C., [α]_D —95.3 (c. 0.5, CHCl₃).

(d) A solution of the hereinabove product (6 g.) in ethyl acetate is stirred with 1.5 g. of Raney-Ni under hydrogen stream. The catalyst is removed by filtration and the solvent is evaporated in vacuo to dryness. The residue is taken up with anhydrous benzene and 0.1 g. of p-toluenesulfonic acid is added. After 1 hour of refluxing the mixture is concentrated in vacuo to small volume and hexane is added to complete precipitation of the product. Yield 3.2 g. (75%) of 5α-pregnane-3,11,20-trione-[17α,16α - d] - 2' - phenyloxazoline, M.P. 150–160° C., [α]_D—14.6° (c. 0.5, CHCl₃).

EXAMPLE 5

Preparation of 5α-pregnane-3β-ol-11,20-dione-[17α, 16α-d]-2'-phenyloxazoline-3-benzoate (a) An amount of 37 g. of 17α-azido-5α-pregnane-3β, 16α-diol-11,20-dione prepared as described in Example 1, are dissolved in 185 ml. of pyridine and carefully treated with 27.5 ml. of benzoyl chloride at the temperature of 0° C. The cooled mixture is then stirred for 1 hour, then for another hour at room temperature; then it is poured into 2000 ml. of ice-water containing 130 ml. of hydrochloric acid. The precipitate is collected, washed and boiled in diethyl ether (about 200 ml.), from which it is recovered after cooling. The dibenzoyl derivative thus obtained weighs 52 g., M.P. 223–225° C., [α]_D —89.9° (c. 0.5, CHCl₂).

(b) An amount of 38 g. of 17α-azido-5α-pregnane-3β,16α-diol-11,20-dione-3,16-dibenzoate, dissolved in 1400 ml. of ethyl acetate is hydrogenated at standard pressure with 2.5 g. of PtO₂. After 3 hours the catalyst is removed by filtration, and the filtrate is evaporated in vacuo to dryness. The residue is suspended in 500 ml. of benzene and is refluxed for 1 hour after addition of 2 drops of concentrated sulfuric acid. The mixture is then cooled and washed with sodium bicarbonate and water, then it is dried over sodium sulfate, and the solvent is evaporated in vacuo. The oily residue is crystallized from isopropanol; it is the desired 5α-pregnane-3β-ol-11,20-dione-[17α,16α-d]-2'-phenyloxazoline-3-benzoate; its weight is 28 g., M.P. 216–217° C., [α]_D +20.7° (c. 0.5, CHCl₃).

EXAMPLE 6

Preparation of 5α-pregnane-3β-ol-11,20-dione-[17α, 16α-d]-2'-butyloxazoline-3-valerate (a) An amount of 50 g. of 17α-azido-5α-pregnane-3β, 16α-diol-11,20-dione prepared as described in Example 1, dissolved in 500 ml. of CH₂Cl₂ and 200 ml. of pyridine are treated with 39.6 ml. of valeroyl chloride (dissolved in 250 ml. of CH₂Cl₂), which is added dropwise at a temperature of —15–18° C. After 1 hour of stirring at —15° C. the mixture is washed with aqueous 10% hydrochloric acid, then with NaHCO₃ and H₂O, then it is dried over Na₂SO₄ and the solvent is evaporated in vacuo. The residue is crystallized from methanol, thus obtaining 44.26 g. (61.6%) of 17α-azido-5α-pregnane-3β,16a-diol-11,20-dione-3,16-divalerate, M.P. 110–112° C., [α]_D —63.6° (c. 0.5, CHCl₃).

(b) An amount of 10 g. of the above product, dissolved in 450 ml. of methanol is hydrogenated for 4.5 hours using 1.3 g. of PtO₂ as the catalyst. Then the catalyst is removed and the solvent is evaporated in vacuo; the residue is 5α-pregnane-3β-ol - 11,20 - dione-[17α,16α-d]-2'-butyloxazoline-3-valerate. After hydrolysis in a methanol solution of KOH the corresponding 3β-ol-derivative is obtained, which when crystallized from ligroin has M.P. 136–137° C., [α]_D +80.5° (c. 0.5, CHCl₃).

We claim:

1. A process for preparing a steroid-[17α,16α-d]-oxazoline with a fused cyclopentane-oxazoline ring system of the formula

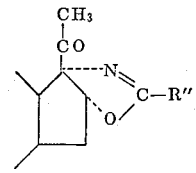

wherein R″ represents a member selected from hydrogen, aryl, aralkyl and lower alkyl groups, which comprises refluxing a steroid of the 16β,17β-epoxy-20-keto-17α-pregnane series with sodium azide in a solvent in the presence of an amount of an acid capable of setting free hydrazoic acid from its salts, reacting the obtained 16α-hydroxy-17α-azide with an agent selected from lower aliphatic and aromatic carboxylic acid acyl anhydrides and chlorides, and catalytically hydrogenating the 16α-acyloxy-17α-azide in the presence of a metal selected from platinum, palladium and nickel as the catalyst.

2. A compound selected from a steroid-[17α,16α-d]-oxazoline of the formula

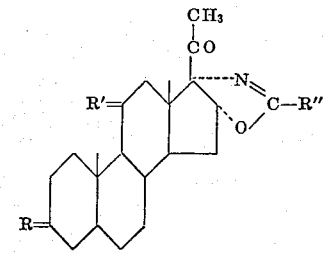

wherein R is a member of the class consisting of

O, H(β-OH) and H(β-O-acyl)

R′ is a member of the class consisting of H₂ and O, R″ is a member of the class consisting of hydrogen, lower alkyl, aralkyl and aryl groups, and its Δ⁴ and Δ⁵⁽⁶⁾-derivatives.

3. A compound of the formula

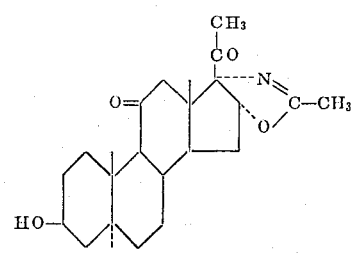

References Cited

UNITED STATES PATENTS 3,297,688   1/1967   Fritsch et al.
3,349,084   10/1967  Ayer et al.

H. A. FRENCH, Primary Examiner.